(12) United States Patent
Brunswig et al.

(10) Patent No.: US 8,122,374 B2
(45) Date of Patent: Feb. 21, 2012

(54) DYNAMIC VALUE SETS IN A SERVICE-ORIENTED BUSINESS FRAMEWORK

(75) Inventors: Frank Brunswig, Heidelberg (DE); Thomas Fiedler, Pfinztal (DE); Wolfgang Koch, Walldorf (DE); Johannes Viegener, Karlsruhe (DE)

(73) Assignee: SAP AG, Walldorf (DE)

( * ) Notice: Subject to any disclaimer, the term of this patent is extended or adjusted under 35 U.S.C. 154(b) by 1780 days.

(21) Appl. No.: 10/963,487

(22) Filed: Oct. 12, 2004

(65) Prior Publication Data

US 2006/0080426 A1    Apr. 13, 2006

(51) Int. Cl.
*G06F 3/048* (2006.01)

(52) U.S. Cl. ........................................................ 715/811

(58) Field of Classification Search .................. 715/711, 715/712, 716, 717, 780, 825
See application file for complete search history.

(56) References Cited

U.S. PATENT DOCUMENTS

| | | | | |
|---|---|---|---|---|
| 6,081,804 A | * | 6/2000 | Smith | ................................ 707/5 |
| 6,307,572 B1 | | 10/2001 | DeMarcken et al. | |
| 6,564,225 B1 | * | 5/2003 | Brogliatti et al. | ...................... 1/1 |
| 2002/0087408 A1 | * | 7/2002 | Burnett | ........................... 705/14 |
| 2003/0036964 A1 | * | 2/2003 | Boyden et al. | .................. 705/26 |
| 2005/0283468 A1 | * | 12/2005 | Kamvar et al. | .................... 707/3 |

OTHER PUBLICATIONS http://www.oneskynetwork.com.
http://www.orbitz.com.
SAP AG 2003; "Retrieval and Classification (TREX)".

* cited by examiner

*Primary Examiner* — Thanh Vu
(74) *Attorney, Agent, or Firm* — Finnegan, Henderson, Farabow, Garrett & Dunner, LLP

(57) ABSTRACT

A method includes receiving a representation of a service, the service including handling of a request for a context-dependent data set derived from one or more collections of data elements. The representation includes a specification of a first data field, a specification of an input data structure including two or more data fields and the first data field, the two or more data fields defining a context for the first data set, a specification of an output data structure, instances of the output data structure including the context-dependent data set, and a name of a service provider. The method stores the representation of the service in a repository, receives a request for the service by a software entity, the request including an instance of the input data structure, checks the request against the representation of the service, sends the request to the service provider, receives one or more instances of the output data structure from the service provider, and sends the one or more instances of the output data structure to the software entity.

25 Claims, 10 Drawing Sheets

$$\underset{\underset{212'}{\uparrow}}{\{\emptyset,}\ \underset{\underset{214'}{\uparrow}}{\emptyset,}\ \underset{\underset{216'}{\uparrow}}{\emptyset,}\ \underset{\underset{218'}{\uparrow}}{\text{"XXX"},}\ \underset{\underset{220'}{\uparrow}}{\text{"YYY"},}\ \underset{\underset{222'}{\uparrow}}{\text{"ZZZ"}\}}$$

230

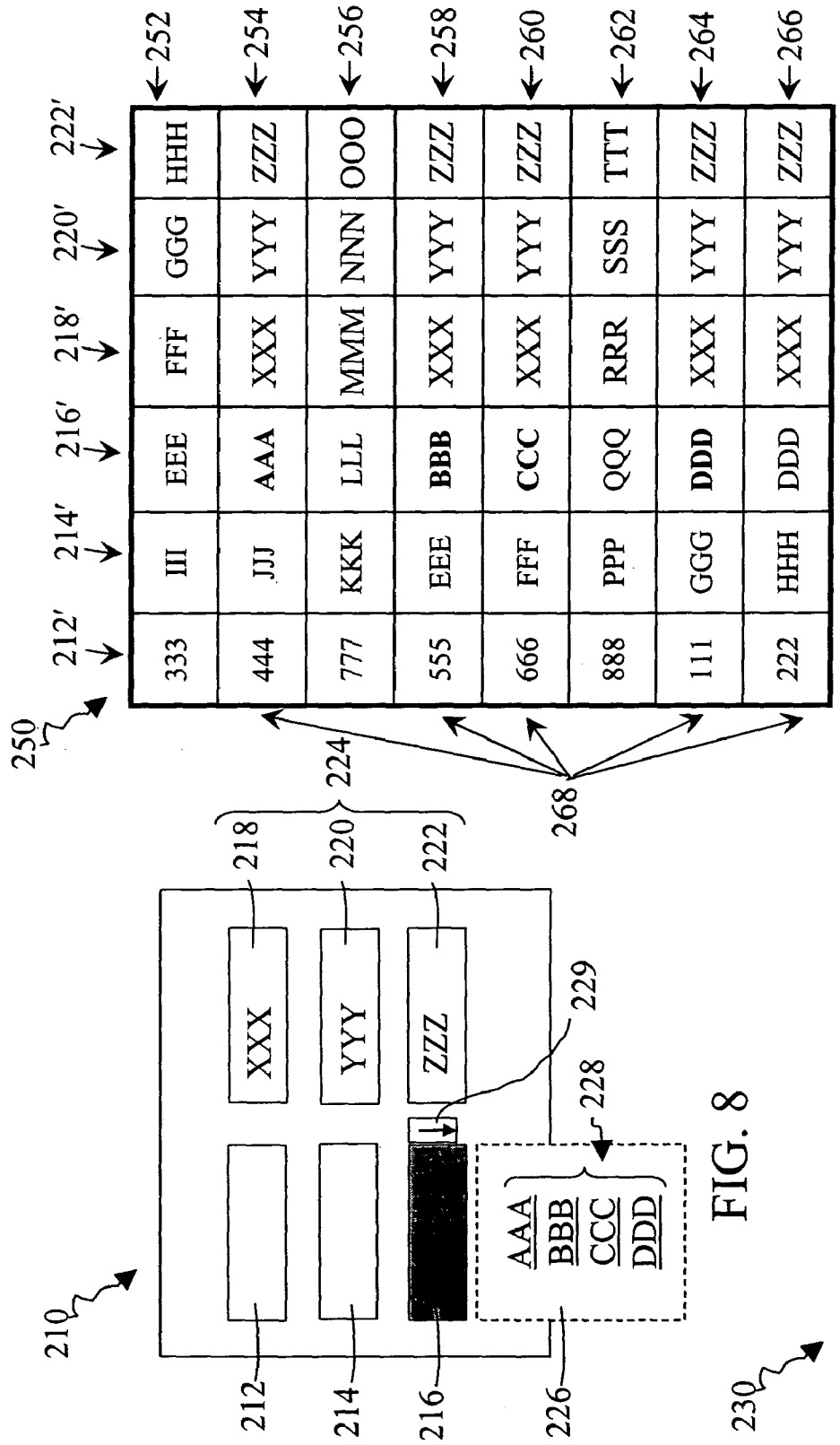

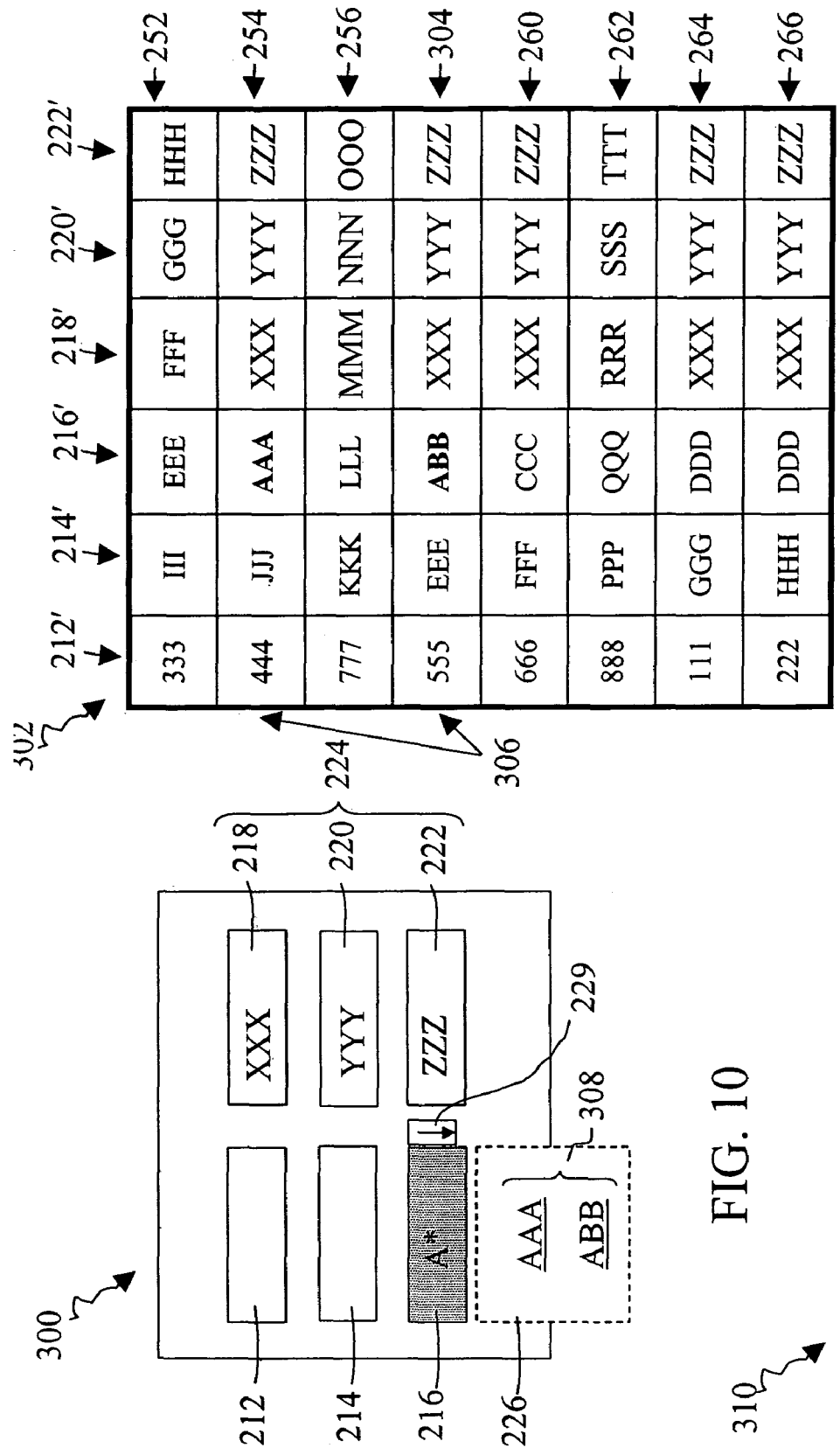

DYNAMIC VALUE SETS IN A SERVICE-ORIENTED BUSINESS FRAMEWORK

TECHNICAL FIELD

The present invention relates to data processing by digital computer, and more particularly to dynamic value sets in a service-oriented business framework.

BACKGROUND

Large-scale business software applications are sometimes categorized in terms of a "front end component" that includes a graphical user interface (GUI) to present data to users and accept data entry from users. Such front-end components are customized for specific customers. Another component of such software applications is sometimes referred to as a "back end component" that stores business data and processes the business data according to business logic. The back end component retrieves, generates, and maintains the business data. The back end component is usually responsible for the consistency and correctness of the data. The back end component also can store relationships between the various data. In a typical business software application, the front-end component includes application code to display, aggregate, and enable modification of data of the back end.

For large-scale business applications, it is sometimes difficult to coordinate software development of the front end and back end components. Meta data, in a repository, has been used to model standard operations on data collections in the back end. This meta data can be used to develop front-end components.

The front-end application code can provide help to users for generating requests to the back end for data retrieval operations. One essential feature for a user interface is adequate help values for entry fields. This help may include pull down windows with choices for a user to select from. In many state-of-the-art applications these help values are presented as list boxes or combo boxes with values retrieved from a static list. Thus, the help values are fixed for the lifetime of the application.

SUMMARY

In one aspect, the invention features a method including receiving a representation of a service, the service including handling of a request for a context-dependent data set derived from one or more collections of data elements. The representation includes a specification of a first data field, a specification of an input data structure including two or more data fields and the first data field, the two or more data fields defining a context for the first data set, a specification of an output data structure, instances of the output data structure including the context-dependent data set, and a name of a service provider. The method stores the representation of the service in a repository, receives a request for the service by a software entity, the request including an instance of the input data structure, checks the request against the representation of the service, sends the request to the service provider, receives one or more instances of the output data structure from the service provider, and sends the one or more instances of the output data structure to the software entity.

In embodiments, the service provider determines the context-dependent data set by matching the data elements of the one or more collections against the instance of the input data structure of the request. The matching can include matching one or more fields of the data elements of the one or more collections against one or more fields of the instance of the input data structure of the request. The one or more fields of the instance of the input data structure can be unspecified, and further wherein the data elements of the one or more collections can be not matched against the unspecified one or more fields of the instance. The software entity can control a graphical user interface and the context-dependent data set can be a set of help values for a user. The graphical user interface can enable the user to select a value from the help values. The one or more collections of data elements can data elements stored in a database.

The method can include receiving a request for modifications to a collection from the one or more collections of data elements, sending the request to a service provider, the service provider configured to store the modifications in a transaction buffer and subsequently update the database with the modifications. A collection from the one or more collections of data elements can include modifications to the data elements in the transaction buffer. The output data structure can include a data structure of the context-dependent data set and a text description of each data element in the context-dependent data set. The data elements can be text strings, and further wherein the instance of the input data structure in the request can include a beginning of a text string and a wildcard symbol. The service provider can detect the wildcard symbol and can determine the one or more instances of the output data structure by matching beginnings of the data elements in the one or more collections against the beginning of the text string of the instance of the input data structure.

In another aspect, the invention features a system including a first computer configured to execute a client program, a second computer configured to execute a server program, a network linking the first and second computers such that the server program can be configured to execute the following: receive a representation of a service, the service including handling of a request for a context-dependent data set derived from one or more collections of data elements, the representation including a specification of a first data field, a specification of an input data structure including two or more data fields and the first data field, the two or more data fields defining a context for the first data set, a specification of an output data structure, instances of the output data structure including the context-dependent data set, and a name of a service provider, store the representation of the service in a repository, receive a request for the service by a software entity, the request including an instance of the input data structure, check the request against the representation of the service, send the request to the service provider, receive one or more instances of the output data structure from the service provider, and send the one or more instances of the output data structure to the software entity.

In embodiments, the service provider determines the context-dependent data set by matching the data elements of the one or more collections against the instance of the input data structure of the request. The matching can include matching one or more fields of the data elements of the one or more collections against one or more fields of the instance of the input data structure of the request. The one or more fields of the instance of the input data structure can be unspecified, and further wherein the data elements of the one or more collections can be not matched against the unspecified one or more fields of the instance. The software entity can control a graphical user interface and the context-dependent data set can be a set of help values for a user. The graphical user interface can enable the user to select a value from the help values. The one or more collections of data elements can data elements stored in a database.

The system can include receiving a request for modifications to a collection from the one or more collections of data elements, sending the request to a service provider, the service provider configured to store the modifications in a transaction buffer and subsequently update the database with the modifications. A collection from the one or more collections of data elements can include modifications to the data elements in the transaction buffer. The output data structure can include a data structure of the context-dependent data set and a text description of each data element in the context-dependent data set. The data elements can be text strings, and further wherein the instance of the input data structure in the request can include a beginning of a text string and a wildcard symbol. The service provider can detect the wildcard symbol and can determine the one or more instances of the output data structure by matching beginnings of the data elements in the one or more collections against the beginning of the text string of the instance of the input data structure.

These and other embodiments may have one or more of the following advantages. The value set requests return data that is dependent on a context so the data is dynamic rather than a static list. The representation (also known as meta data) of the value set requests enables easier development of front-end component software. The value set requests can include a context and data returned is dependent on the context. The value set requests also can request reads of data in intermediate buffers before the data is stored in backend databases. The value set requests can include a wildcard.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 8 is a display of a GUI with a list of appropriate values for a selected field.

FIG. 8A is a display of an INPARAMS structure sent as part of a value set request for the GUI of FIG. 8.

FIG. 9 is a display of a set of stored data elements representing possible combinations of data for the fields of the GUI of FIG. 8.

FIG. 10 is a display of a GUI with a list of appropriate values for a selected field having a wildcard.

FIG. 10A is a display of an INPARAMS structure sent as part of a value set request for the GUI of FIG. 10.

FIG. 11 is a display of a set of stored data elements representing possible combinations of data for the fields of the GUI of FIG. 10.

Like reference symbols in the various drawings indicate like elements.

DETAILED DESCRIPTION

Figure 1:
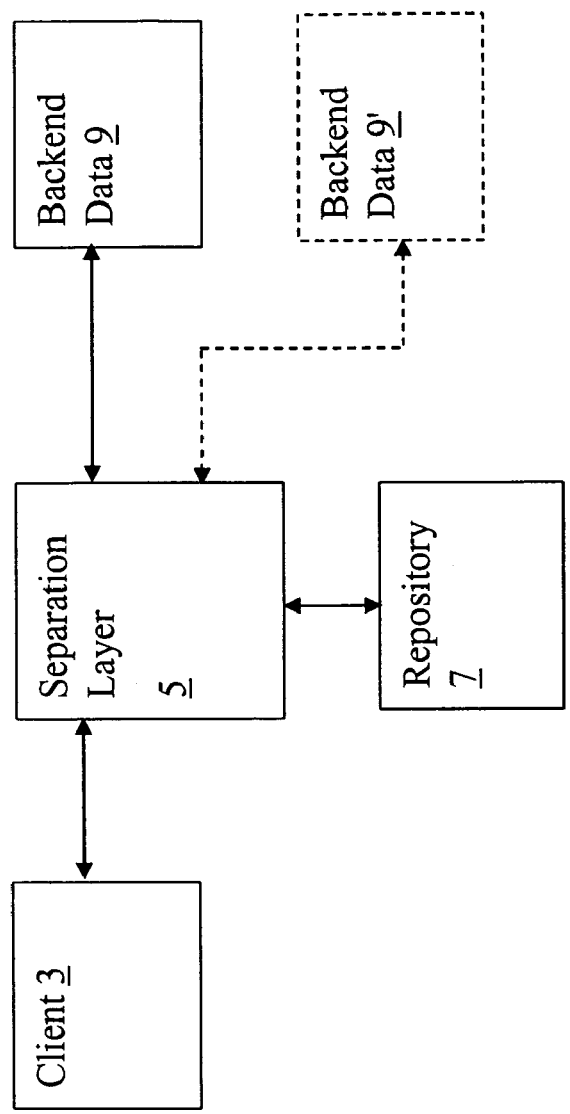
FIG. 1 is a block diagram of an example logical representation of a business software application.

FIG. 1 illustrates an overview logical representation of a business software architecture 2, which includes a client 3, a separation layer 5, a repository 7 and backend data 9 and 9'. Client 3 provides a user interface (UI) that enables a user to interact with the backend data 9 and/or 9'. Backend data 9 and 9' can be associated with different backend applications and/or can be arranged and formatted differently from each other. Separation layer 5 separates the front end user interface provided by client 3 from the back end data 9 and 9'. This separation enables client 3 to interact with backend data 9 and 9' in a consistent and similar manner, regardless of the formatting or application-associated differences between backend data 9 and 9'. In other words, separation layer 5 provides a canonical interface to backend data 9 and 9' so that client 3 is configured to interact with separation layer 5 and only needs to be updated if separation layer 5 changes. Changes to backend data 9 and 9' do not necessitate an update to client 3. Further, separation layer 5 is scalable and configured to handle changes and growth to backend data 9 and 9' and any other disparate backend data and backend services that are further connected to separation layer 5.

As described in more detail below, separation layer 5 is based on a meta model that defines how backend data (e.g., 9 and 9') are represented in separation layer 5. Meta data is stored in repository 7 that describes how the backend data 9 and 9' fit into the meta model representation. Client 3 interacts with backend data 9 and 9' using a generic command set defined by separation layer 5. As described in more detail below, separation layer 5 accesses service providers that perform the generic commands from client 3, using the meta data in repository 7, to effect the requested manipulation of backend data 9 and 9'. The service providers are configurable so that different service providers can be used for different backend data 9 and 9'. Separation layer 5 includes an interface (e.g., a service manager) that hides the characteristics of the corresponding backend data 9 and 9' and also the granularity and distribution of the implementation (i.e., the service providers).

One example of the architecture 2 is described by U.S. application Ser. No. 10/747,018 for SERVICE MANAGEMENT OF A SERVICE-ORIENTED BUSINESS FRAMEWORK, filed Dec. 23, 2003, the disclosure of which is incorporated by reference in its entirety. This example, denoted as the Enterprise Service Framework (ESF) Service layer, is an interface and modeling facility for supporting different scenarios described above.

Figure 2:
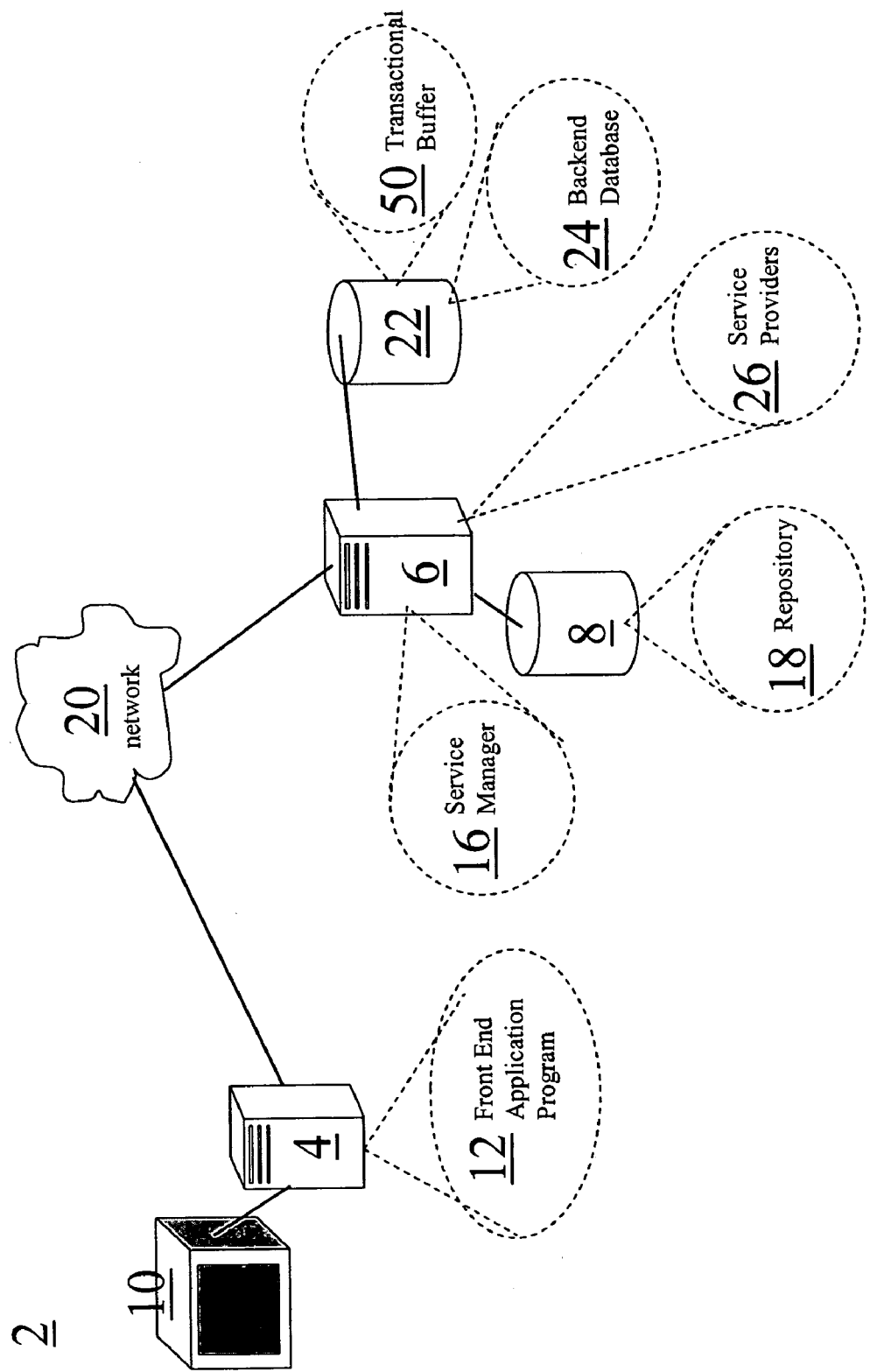
FIG. 2 is a view of a network configuration for a business software application.

FIG. 2 illustrates this example of the business software architecture 2. As shown in FIG. 2, the business software architecture 2 includes a first computer 4 and a second computer 6. The computers 4 and 6 each can include a processor, a random access memory (RAM), a program memory (for example, a writable read-only memory (ROM) such as a flash ROM), a hard drive controller, a video controller, and an input/output (I/O) controller coupled by a processor (CPU) bus. The computers 4 and 6 can be preprogrammed, in ROM, for example, or the computers 4, 6 can be programmed (and reprogrammed) by loading a program from another source (for example, from a floppy disk, a CD-ROM, or another computer) into a RAM for execution by the processor. The hard drive controller is coupled to a hard disk suitable for storing executable computer programs, including programs embodying the present invention, and data. The I/O controller is coupled by an I/O bus to an I/O interface. The I/O interface receives and transmits data in analog or digital form over communication links, e.g., a serial link, local area network, wireless link, or parallel link. Also coupled to the I/O bus are a display and a keyboard. Alternatively, separate connections (separate buses) can be used for the I/O interface, display, and keyboard.

A network 20 connects computers 4 and 6. The network 20 is any form or medium of digital data communication, e.g., a communication network. Examples of communication network 20 include a local area network ("LAN") and a wide area network ("WAN"), e.g., the Internet.

Computer 4 executes instructions of a front-end application program 12. Application program 12 represents a front-end component of the business software architecture 2. Service manager 16, running on computer 6, is a service layer between the front-end application program 12 and a set of back end service providers 26. Service manager 16 provides a service interface to front end application program 12 to enable indirect interaction with the set of back end service providers 26 running on computer 6. This service interface allows for a partial separation of software development for front-end application program 12 and the set of back end service providers 26.

Computer 6 includes a data storage device 22 that stores a back end database 24 containing data that can be used by the set of back end service providers 26. A transactional buffer 50 is used to store modifications to the database 24. Computer 6 also includes a data storage device 8 containing an information repository 18 that defines and describes the services provided by the set of back end service providers 26. The meta data in repository 18 is organized according to a meta model and stored in an additional database. In some examples, the meta data in the repository 18 is stored in tables.

In general, a meta model is a collection of "concepts" that are the vocabulary with which a certain domain can be described. Meta models typically are built according to a strict rule set, which in most cases is derived from entity-relationship-attribute or object-oriented modeling. The front-end application program 12 can access (and interpret according to the strict rule set) the contents of repository 18 via the service manager 16. These services support the functionality of application program 12 and include retrieving and reading data in addition to modifying stored data. The service providers 26 can access or modify stored data in backend database 24 to provide services to front end application program 12. To provide the services, the set of back end service providers 26, upon request from the front end application program 12, either access or modify stored data in backend database 24 or calculate new data.

The repository 18 defines a syntax for requesting services provided by the set of back end service providers 26 and semantically describes the services. As front-end application program 12 executes, front-end application program 12 can use this syntax and semantic description from the repository 18 (accessed through the service manager 16) to determine what services front-end application program 12 can use to meet its requirements. This syntax and semantic description for stored or computed backend data can be referred to as "meta data". This stored or computed backend data is conceptually organized using object-oriented terminology in terms of business objects, where each business object is an instance of a class or data entity type. In one example, a class of business objects refers to a relational database table where each row of data in the table represents the data for a particular business object. In this example, each field in the table represents an attribute of the business object class. In another example, there is a class of business objects that partially refers to a relational database table such that some of the fields in the table represent attributes of the business object class and other fields are computed upon request.

In the business software architecture 2, services provided to front end application program 12 are focused on data (i.e., data-centric) so the description of these services in repository 18 is also data-centric. Thus, the meta data in repository 18 is structured around representations of classes of these business objects. This meta data includes aspects, or descriptions of these representations of business object classes, and descriptions of available operations on aspects such as select, insert, update, delete, select by relation, and update fields that are provided by service providers 26. Each description of these aspects includes data attributes as well as actions that can be requested to be executed by the set of backend service providers 26 on instances of these aspects.

Classifications of data, relations between data classes, pre-built queries for accessing data, and other descriptions of data provided by the set of backend service providers 26 are represented by repository 18. This representation, or meta data, of data (e.g., stored in backend database 24) provided by the set of backend service providers 26 describes different abstract types or classes of data in backend database 24 and how different data classes relate to each other. Objects are instances of these different abstract types. Meta data is information about data rather than content of the data. The meta data also defines a set of pre-built queries that can be executed on the data in database 24.

The semantic description in repository 18 can enable front-end application program 12 to determine which services to request from service manager 16. These services often take the form of requesting data to display. Front-end application program 12 reads the meta data in repository 18 and can flexibly request data organized in different ways that are specified by the meta data. For example, two service managers 16 with two different repositories 18 handle services that determine prices of books for companies A and B. For A and B, book prices are represented by different aspects with different data fields. Front-end application program 12 reads A's repository 18 to obtain descriptions of data (including a price) concerning a particular book from A's service providers 26. Front-end application program 12 reads B's repository 18 to obtain descriptions of data (including a price) concerning a particular book from B's service providers 26. Front end application program 12 is able to request and display the information from A's service provider 26 and the information organized differently from B's service provider 26 to present the book price information to a user.

During execution, front end application program 12 issues service requests to service manager 16, service manager 16 checks the requests for consistency with the meta data in repository 18, and then the service manager 16 passes the requests to back end service providers 26 according to the meta data in the repository database 18. The manner of implementing the set of back end service providers 26 and data in database 24 is independent of application 12, with back end service providers 26 and data in database 24 conforming to the definitions and descriptions of the meta data in the repository 18. Database 24 can be a relational database. However, database 24 can be modified to use a different mode of data organization other than a relational database and front end application program 12 does not need to be modified if back end service providers 26 and data in database 24 still conform to the meta data in the repository 18. One such different mode of data organization for database 24 can be an object-oriented database.

Front-end application program 12 provides user interfaces displayed on monitor 10. Front-end application program 12 provides application code to display and aggregate the data received from the set of backend service providers 26. Front end application program 12 is interaction-centric, focused on aggregating data of the back end service providers 26 and combining interactive steps into a flow of screens and syndicated screen elements.

Front-end application program 12 contains screen-flow logic of User Interface (UI) oriented applications and front-end application program 12 binds a UI to the meta data in repository 18.

In some implementations, a service manager proxy 14 gives the front end application program 12 a buffered access to a service interface provided by service manager 16. Service manager proxy 14 is a server on computer 4 that acts as an intermediary between the front-end application program 12 and the service manager 16 so that the business software architecture 2 can ensure security, administrative control, and caching service. The service manager 16 offers a queuing functionality, which is used by the front end application program 12 to bundle several service requests or commands (resulting in service methods) into a single service method queue in order to save round trips.

In one example, the front-end application program 12 communicates with service manager 16 either directly or via a proxy using SOAP (Simple Object Access Protocol) messages via network 20. SOAP is a way for a program running in one kind of operating system (such as a Windows® XP Operating system available from Microsoft Corporation of Redmond, Wash.) to communicate with a program in the same or another kind of an operating system (such as Linux) by using the World Wide Web's Hypertext Transfer Protocol (HTTP) and Extensible Markup Language (XML) as mechanisms for information exchange. Since Web protocols are installed and available for use by all major operating system platforms, HTTP and XML provide a solution to a problem of how programs running under different operating systems in a network can communicate with each other. SOAP specifies exactly how to encode an HTTP header and an XML file so that a program in one computer can call and pass information to a program in another computer. SOAP also specifies how the called program can return a response.

Figure 3:
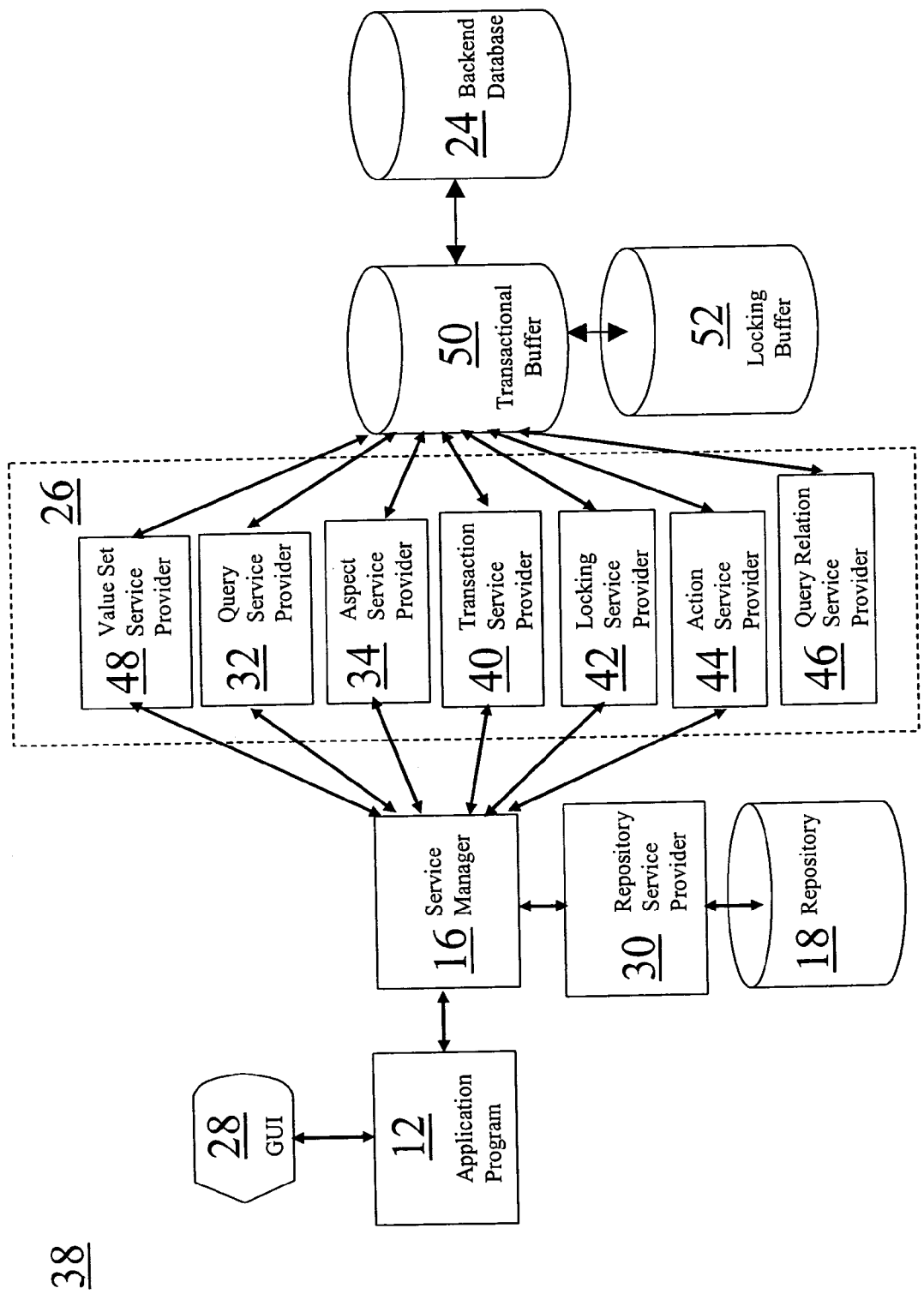
FIG. 3 is a block diagram of the business software application of FIG. 1.

As shown in FIG. 3, the service manager 16 provides an interface (defined by the meta data in repository 18) to front end application program 12 that hides the characteristics of the corresponding back end service providers from the set of backend service providers 26 and data in database 24. Front-end application 12 uses this interface to retrieve data from backend database 24 to display in graphical user interface (GUI) 28 for interaction with a user.

The service manager 16 provides the interface to front end application program 12 by receiving and executing requests from front end application program 12 to backend service providers 26. After each receipt of a request by the service manager 16, the service manager 16 delegates the request to one or more service providers 30, 32, 34, 40, 42, 44, and 46. Service provider 30 is an instance of a software class repository service provider. Service providers 32, 34, 40, 42, 44, and 46 represent instances of software classes such as query service provider class (32), aspect service provider class (34), transaction service provider class (40), locking service provider class (42), action service provider class (44), and query relation service provider class (46). The software classes for service providers 32, 34, 40, 42, 44, and 46 can be implemented as ABAP global classes maintained by the ABAP class library using the ABAP development environment available from SAP of Walldorf, Germany. They also can be implemented by any other programming language on any other platform, e.g., Java on Linux or C# on Windows.

Repository service provider 30 handles requests to get or modify meta data from repository 18. Query service provider 32 handles queries on data in backend database 24 from front-end application program 12. Aspect service provider 34 handles accessing and modifying data, navigation through relations, and calling actions. The aspect service provider 34 has a standard set of methods that correspond to the standard operations on aspects that can be requested from the service manager 16. These standard operations include select, insert, update, delete, select by relation, and update fields. Transaction service provider 40 allows business logic to act on different states of a transaction between front-end application program 12 and service providers 26. Locking service provider 42 enables separation of concurrent accesses on data types in backend database 24. Action service provider 44 enables execution of actions on aspects. Query relation service provider 46 is the interface for the target aspect of a relation. In some examples, service manager 16 can have different multiple instances of service providers 32, 34, 40, 42, 44, and 46 for different elements in repository 18 representing services. Upon receiving a request for a service represented by an element in repository 18, the service manager 16 can look up a name of a service provider (e.g., 32, 34, 40, 42, 44, and 46) in the meta data for the element in repository 18. For example, the meta data describing an aspect in repository 18 defines which aspect service provider 34 is designed to handle services for the aspect. The service manager 16 uses this information in the meta data to direct requests from the front-end application program 12 to the appropriate aspect service provider 34. Similarly, the meta data describing a query in repository 18 defines which query service provider 32 is designed to handle services for the query. The front-end application program 12 can make requests such as insert, update, and delete to modify data in the back end database 24. Aspect service provider 34 or action service provider 44 can handle such requests. These data-modifying operations are not performed on the backend database 24 directly. To allow well-defined transaction handling for these operations, each modifying operation is performed on a transactional buffer 50 that is controlled by the transaction service provider 40. Only the methods of the transaction service provider 40 lead to a database commit or a rollback of the buffered data. In addition, the locking service provider 42 performs locking operations before the data is changed. Each locking operation must also be buffered.

Within the transactional buffer 50, it should be clearly marked which modifying operation (such as insert, update, delete) was performed on which aspect row. Later on during a SAVE event, the application data storage is changed according to this buffer content, provided all checks during a BEFORE_SAVE event were successful.

A transaction is a sequence of information exchange and related work (such as database updating) that is treated as a unit for the purposes of satisfying a request from front end application program 12 to service manager 16 and for ensuring integrity of backend database 24. For a transaction to be completed and changes to database 24 to be made permanent, a transaction has to be completed in its entirety. All of the steps of a transaction are completed before the transaction is successful and the database is actually modified to reflect all of the requested changes. If something happens before the transaction is successfully completed, any changes to the backend database 24 must be kept track of so that the changes can be undone.

To handle transactions, the transaction service provider 40 receives notifications on the various states of a transaction between service manager 16, another non-transaction service provider (e.g., 32, 34, 44, 46), and front-end application program 12 (or service manager proxy 14 in some cases). These notifications are the transaction service provider 40's methods BEFORE_SAVE, CLEANUP, and SAVE that are called by the service manager 16 during transactions.

The service manager 16 calls the transaction service provider 40's method BEFORE_SAVE to check if data in the transactional buffer 50 can be saved. This allows checking if the internal state of the non-transaction service provider is ready for being saved. The method BEFORE_SAVE returns false if it is not possible to save data in the transactional buffer 50, then the transaction end is aborted. Thus, the BEFORE_SAVE method has a BOOLEAN return parameter. BEFORE_SAVE takes a Boolean as an input parameter REJECTED. The transactional service provider 16 can prevent the following save and commit operations by setting the REJECTED parameter to a non-initial value, i.e. to "true". The method BEFORE_SAVE is called within the service manager's 16's sequence of operations triggered by the front-end application 12's SAVE method.

The SAVE method finally triggers the application to save the transactional buffer 50 to the database 24. By calling SAVE, all internal states of a non-transaction service provider are made persistent—either by direct updates or by creating appropriate calls to the update task. If all service providers in architecture 38 have received a SAVE request, service manager 16 commits the transaction.

The CLEANUP method tells all non-transaction service providers to release all their transactional buffers and enqueue-based locks. Calling CLEANUP method communicates that all service providers in architecture 38 need to clean up their internal state. CLEANUP takes a REASON string as an input parameter. The REASON field indicates the reason for the clean up operation. This can be either a 'COMMIT' due to a SAVE-operation or the 'END' of the transaction due to the system closing the transaction automatically. There is no guarantee that cleanup is called under failure conditions.

The service providers 32, 34, 40, 42, 44, and 46, as described above, enable the following transactional model for the architecture 38. Executing method SELECT of aspect service provider 34 reads from the backend database 24 or reads from the transactional buffer 50 stored in the back-end. Aspect service provider 34 merges data from both sources— the database and its transactional buffer 50—in a consistent way so that the merge data reflects the updates made so far in this transaction. Next, executing UPDATE, INSERT, MODIFY, or DELETE methods of aspect service provider 34 builds up a transactional buffer. Before actually changing data in the transactional buffer 50, the service manager 16 has to acquire a transactional lock on the data and read the data under the protection of a lock. There are exclusive, shared, and shared promotable lock modes available using locking service provider 42 as described previously. Locking has to be accompanied by selecting the locked data again under the protection of the lock. Applications can support optimistic locking by providing time-stamped or otherwise versioned data, and merging actual and modified data on the front-end in case of conflicts.

The BEFORE_SAVE method of the transaction service provider 40 enables all participating service providers to declare if they are ready for saving the transactional buffer 50. The SAVE method of the transaction service provider 40 finally triggers service manager 16 to save the transactional buffer 50 to the backend database 24.

The CLEANUP method of the transaction service provider 40 notifies all service providers (e.g., aspect service provider 34) to release all their transactional buffers (e.g., 50) and enqueue-based locks. If CLEANUP is called with reason 'END', all locks have to be released. If reason is set to 'COMMIT', each service provider can chose to keep its locks.

Aspect service provider 34 must not call COMMIT WORK or ROLLBACK WORK internally on its own. The service manager 16 enforces this by automatically aborting the transaction if aspect service provider 34 is trying to commit a transaction.

The supported locking models and lock policies are as follows. Using policy S, many participants can obtain a shared lock. If a shared lock is obtained on an object, no exclusive lock or SP lock can be obtained. Shared locks can only be used to achieve a consistent view on a larger set of data during read operations. Using policy E, only a single participant can obtain a lock. Using policy SP (shared promotable), many participants can obtain the lock. If a SP lock exists, exclusive locks can only be obtained by participants already having a SP lock on the object. Only one of the participants can upgrade the lock to an exclusive lock. No other participant, who did obtain a lock prior to the upgrade, can upgrade to exclusive even if the first participant did release its lock.

In addition to the transactional buffer 50, a locking buffer 52 stores the locking status of the aspect rows that are used during the transactional context.

Business software typically provides consumers with scenario-specific interface technology to access and update business application logic and business data. One essential feature for a user interface is adequate help values for entry fields. In many state-of-the-art applications these help values are presented as list boxes.

As long as the list of possible values is static (i.e. not depending on a specific instance of an aspect (i.e., aspect row) or other input data), the value help can be separated from business logic. The possible values are then part of the type information for the field. However, in the dynamic case where business logic needs to provide the real values for a field in a given aspect row, the value list should be transported and provided through the service manager 16. In some examples, the business logic can provide these values by filtering the list of possible values based on a context established by data previously entered by the user.

The architecture 38 provides a dynamic field-bound context-related value set infrastructure and programming model. The service manager 16 provides a value set interface that can be implemented by the value set service provider 48 and that can be called by the application program 12 at runtime. The architecture 38 provides the service provider 48 all necessary context information without affecting any transactional buffer (e.g., buffer 50). The application and service providers have to be compliant with a standard wildcard-query mechanism of the architecture 38. The value set infrastructure provides a standardized and easy to use way for accessing dynamic value sets in the service-oriented business architecture 38.

A value set service provider 48 provides an interface IF_COL_VALUE_SET that provides a service or method GET_VALUE_SET to handle a value set request. The application program 12 requests the service GET_VALUE_SET to retrieve value set data from the backend database 24 and its transactional buffer 50. As with other requests using the architecture 38, the application program 12 sends the request to the service manager 16, the service manager 16 checks the request against meta data in the repository 18, and then the service manager 16 passes the request to the service provider 48. The service provider 48 is specified in the request. The service provider 48 handles the request and sends back a value set to the application program 12 through the service manager 16. The meta data describing the value set request provides a standard description of possible value sets that can be requested by the application program 12.

The returned value set data is dependent on a context that is possibly determined by a set of input values and a set of possible values stored in the database 24 and its transactional buffer 50. These values can be grouped into a data structure. The input values are an instance of the data structure, with some fields of the data structure left unspecified. The set of possible values are possible instances of the data structure stored in the backend database 24 and its transactional buffer 50. The application program 12 also specifies a field of interest for which value set data is to be provided. The service provider 48 then matches the instance of the data structure against all of the instances of the data structure stored in the backend database 24 and its transactional buffer 50. Unspecified fields in the instance of the data structure do not constrain this matching. The stored instances of the data structure that match the instance are then put in a list. Values of the field of interest of these matching instances are put into a second list. This second list is sorted and redundant values are removed to form a third list. The context-dependent value set data is this third list that is passed to the application program 12.

In some examples, the service provider 48 may use a search engine on the backend database 24 and its transactional buffer 50. An example of such a search engine is the TRex® server that is commercially available from SAP® of Walldorf, Baden, Germany. The TRex® server is software that can also be installed on a separate server. TRex® is equipped with a variety of search functions: general queries, searches for special terms, Boolean searches linked with "and" as well as the "search similar" function. In addition to linguistic queries, such as different forms of the same word, and complex searches by author or date, TRex® also offers search functions provided by popular Internet search engines.

In some examples, the value set service is also available for free-style user interfaces and other clients, e.g. other services calling services by the service manager 16.

One purpose of the value set data is to provide context-dependent help data to a user of a user interface such as GUI 28. The context-dependent help data can be provided to the user using different techniques. For example, the list of possible values or description texts for values is presented in a drop-down list box, which is filled via a list of key-value-pairs.

The list of values can also be presented in a specific result view (either separate frame or replacing current frame content) when a value-help button is pressed. The structure of the result view can be specific for a field and may contain more than one column.

The request for value-help can also lead to the start of a separate application including an object identification pattern component with simple and advanced search facilities.

The method GET_VALUE_SET has input parameters STRUCTURE, FIELD, and INPARAM. That is, application program 12 inputs parameters STRUCTURE, FIELD, and INPARAM when the application program 12 calls the method GET_VALUE_SET. Parameter STRUCTURE contains a string name of a predefined data structure that stores records displayed by the GUI 28. Parameter FIELD is a string name of a field in the data structure for which value help is to be provided by the service provider 32. Parameter INPARAM contains data for the dynamic value help request.

The method GET_VALUE_SET has output parameters OUTVALUES and REJECTED. That is, application program 12 receives parameters OUTVALUES and REJECTED when the application program 12 calls the method GET_VALUE_SET. Parameter OUTVALUES is an INDEX TABLE type containing possible values for the FIELD for this value help request. Parameter REJECTED is a Boolean data type and indicates whether there was an error in executing the method GET_VALUE_SET by the service provider 48 (REJECTED=TRUE) or no error occurred (REJECTED=FALSE).

Before the value set request is started, it is not necessary to send changed data into the transactional buffer of the backend. The actual changes of the current aspect row on the GUI 28 are transported to the backend database 24 for the value request via the input parameters (INPARAM) only. The application 12 might support some kind of wild card mechanism for the aspect fields. If the field is typed as a character or a string, search requests like *X* might be send via the input parameters to the backend. The implementation of the wild card search is in the responsibility of the backend.

For each value set, meta data is supplied to describe the value set service provided by the service provider 32. The meta data includes an input parameter structure, an outvalues structure, and a name of a value set service provider 48. The input parameter structure is the INPARAMs structure that can be used for dynamic context-related value sets. The outvalues structure is the OUTVALUES structure containing the list of the allowed values for the actual field. These allowed values can be a simple key-text-list or a structure with more decrypting information to each value. Lastly, the value set provider class implements the interface IF_COL_VALUE_SET.

As mentioned previously, the meta data in the repository 18 is stored in database tables. For value sets, in one example, meta data for each value set request is stored as records of a table SCOL_VALUE_SET. Table SCOL_VALUE_SET has the following fields.

| | |
|---|---|
| VALUE_SET_NAME | Name of the dynamic value set |
| FIELDNAME | Name of the field for which the value set is required |
| PARAM_STRUCTURE | Input parameter structure |
| OUTVAL_STRUCTURE | Output values structure |
| PROVIDER_CLASS | Value set service provider class |
| EDITORDER | Order of entry of this dynamic value set in the meta data repository screen |

In examples, the field PROVIDER_CLASS specifies the value set service provider 48. The service manager 16, upon receiving a request for a particular dynamic value set (specified by VALUE_SET_NAME), looks up the record corresponding to the dynamic value set name and then retrieves the name of the value set service provider 48 in field PROVIDER_CLASS. The service manager 16 then calls the method GET_VALUE_SET of the interface IF_COL_VALUE_SET provided by the value set service provider 48.

An example of the table SCOL_VALUE_SET is provided by Table 1 below. Table 1, SCOL_VALUE_SET, illustrates meta data for value sets CARRID, CITYFROM, CONNED, and PRICE. These value sets can be used to request help values for the GUI 28 for an aspect SCOL_FLIGHTS_DETAIL. Examples are described below that use the value sets CARRID and CITYFROM.

TABLE 1

SCOL_VALUE_SET

| VALUE_SET_NAME | FIELD NAME | PARAM_STRUCTURE | OUTVAL_STRUCTURE | PROVIDER_CLASS | EDIT ORDER |
|---|---|---|---|---|---|
| CARRID | CARRID | SCOL_FLIGHTS_DETAIL | SCOL_DDIC_KEY_TEXT_LIST | CL_COL_REF_FLIGHT | 0003 |
| CITY FROM | CITY FROM | SCOL_FLIGHTS_DETAIL | SCOL_DDIC_KEY_TEXT_LIST | CL_COL_REF_FLIGHT | 0001 |
| CONNID | CONNID | SCOL_FLIGHTS_DETAIL | SCOL_DDIC_KEY_TEXT_LIST | CL_COL_REF_FLIGHT | 0002 |
| PRICE | PRICE | SCOL_FLIGHTS_DETAIL | SCOL_DDIC_KEY_TEXT_LIST | CL_COL_REF_FLIGHT | 0004 |

EXAMPLE I

Figure 4:
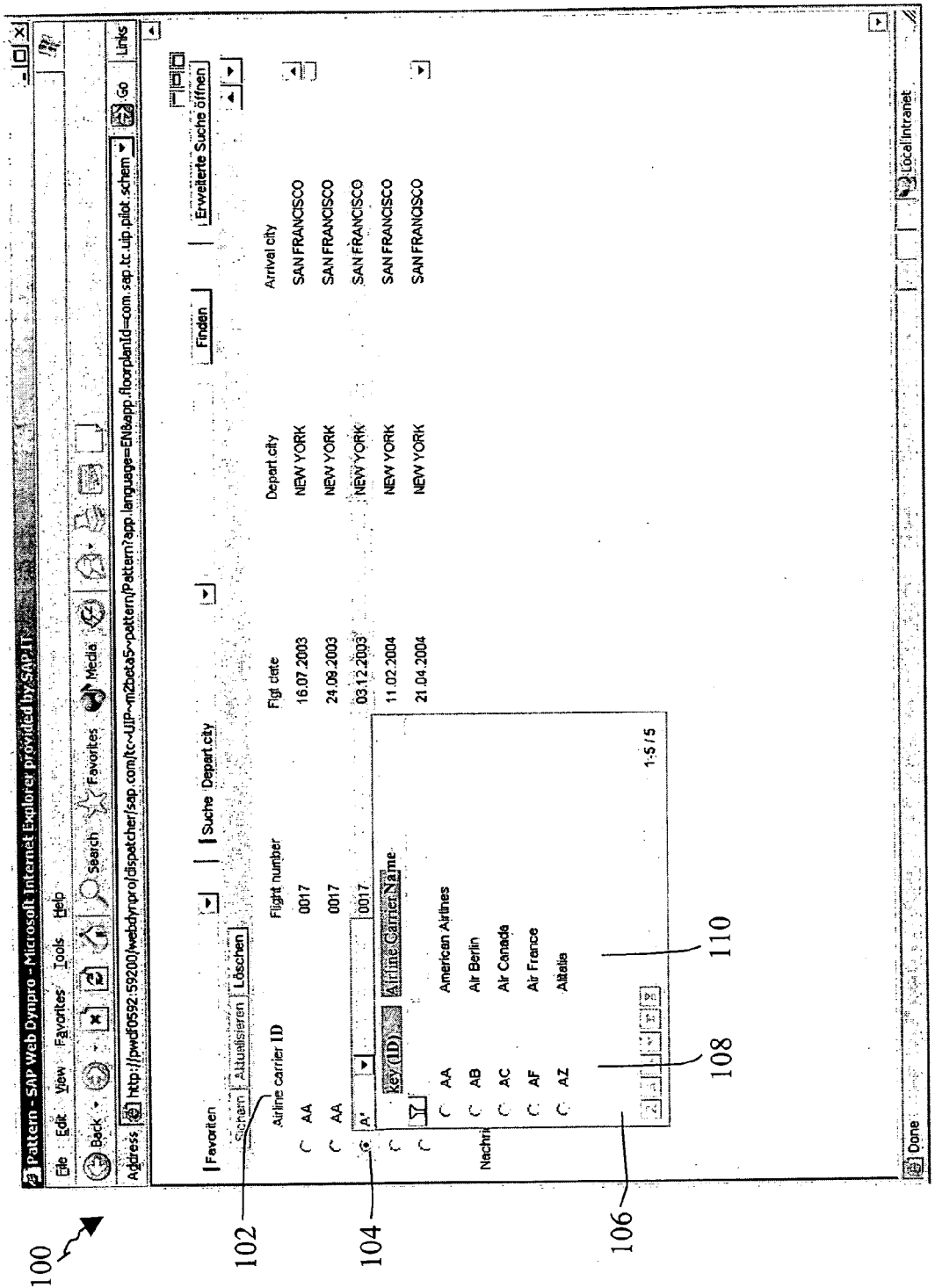
FIG. 4 is a screenshot of a graphical user interface (GUI) with a pop up window with help data.

Referring to FIG. 4, a menu screen 100 represents a usage of value set requests for flight information. Specifically, the menu screen 100 uses value set request CARRID defined in Table SCOL_VALUE_SET of the meta data in the repository 18. The GUI 28 (also represented in FIG. 3) follows instructions of the application program 12 to generate the menu screen 100 for listing flight data stored in the backend database 24 in rows. For each flight in the listing, the menu screen 100 displays five fields including an airline carrier identity (ID), a flight number, a flight date, a depart city, and an arrival city. For each row, the combination of the five data elements is a unique combination. A column 102, denoted as Airline Carrier, displays the airline carrier ID for each row. The menu screen 100 also allows a user to view data about other flights by changing the airline carrier ID for a given row. As shown in FIG. 4, when the user types an "A*" in a row 104, the application program 12 makes the value set request CARRID to the service provider 42 for airlines having IDs beginning with "A". The service provider 34 returns an OUTPARAMS structure for the CARRID value set request, the OUTPARAMS structure including a list of airlines having IDs beginning with "A". The GUI 28 displays a pop-up window 106 with the list to the user. The pop-up window 106 includes two columns of data, a column 108 with airline carrier IDs and a column 110 with full names of the airlines. These airlines include American Airlines®, Air Berlin®, Air Canada®, Air France®, and Alitalia®. The user can select one airline carrier ID (e.g., "AF" corresponding to Air France®) from the list in the pop-up window 106. Subsequently, the GUI 28 closes the pop-up window 106 and replaces the element "A*" with element "AF" in the menu screen 102.

The GUI 28 then can modify the other fields for the row 104 according to the new element "AF". For example, if Air France® does not have a flight with number 0017, on Mar. 12, 2003 departing from New York and arriving at San Francisco, various fields can be blanked out according to some rule and the user can fill in the missing information. For example, if Air France® has flights from New York to San Francisco, then the user can enter data in fields for Flight Number and Flight Date using pop-up windows similar to pop-up window 106, each pop-up window having a finite number of selections based on flight data in the backend database 24 for Air France ®.

An aspect SCOL_FLIGHTS_DETAIL is the meta data corresponding to the flight data stored in the backend database 24. The data corresponding to the aspect SCOL_FLIGHTS_DETAIL is spread out in multiple data tables. The backend database 24 stores Table 2, SCARR. The Table 2 has fields CARRID (carrier ID or acronym), and CARRNAME (carrier full text name) to enable matching an airline carrier ID to its name or vice-versa. The backend database 24 also stores other additional tables containing flight information. These additional tables include fields CONNID, COUNTRYFR, CITYFROM, COUNTRYTO, and CITYTO.

TABLE 2

SCARR

| CARRID | CARRNAME |
|---|---|
| AA | American Airlines |
| AB | Air Berlin |
| AC | Air Canada |
| AF | Air France |
| AZ | Alitalia |
| BA | British Airways |
| CO | Continental Airlines |
| DL | Delta Airlines |
| FJ | Air Pacific |
| JL | Japan Airlines |
| LH | Lufthansa |
| NG | Lauda Air |
| NW | Northwest Airlines |
| QF | Qantas Airways |
| SA | South African Air |
| SQ | Singapore Airlines |
| SR | Swiss |
| UA | United Airlines |

As described previously, the meta data descriptions of value set requests include values for STRUCTURE, FIELD, INPARAM, OUTVALUES, and REJECTED. For the meta data description of the value set request on the aspect SCOL_FLIGHTS_DETAIL to get value help information for the pop-up window 106, the STRUCTURE is a string "SCOL_FLIGHTS_DETAIL" denoting the aspect SCOL_FLIGHTS_DETAIL. The FIELD is a string "CARRID" denoting the CARRID field in Table 2. Thus, the meta description of this value set request specifies that this value set request is intended to return possible values for the CARRID field. The INPARAM is SCOL_FLIGHTS_DETAIL so that the application 12 is expected to send an instance of the aspect SCOL_FLIGHTS_DETAIL in order to receive the possible values for the CARRID field. It should be noted that this instance of the aspect SCOL_FLIGHTS_DETAIL does not have to be completely filled out. For instance, in the example help value request to generate the pop-up window 108, the instance of the aspect SCOL_FLIGHTS_DETAIL only has one field filled out, the Airline Carrier or CARRID field, with a wildcard. The OUTVALUES, or return index table, is SCOL_DDIC_KEY_TEXT_LIST. This SCOL_DDIC_KEY_TEXT_LIST index table is defined in the meta data of the repository 18 to include two fields: FIELDKEY and TEXT. Thus, the SCOL_DDIC_KEY_TEXT_LIST is a two-column table. When an instance of the return index table SCOL_DDIC_KEY_TEXT_LIST is passed to the application program 12 from the service provider 34, the FIELDKEY field contains the CARRID information and the TEXT field contains the CARRNAME information for instances of the aspect SCOL_FLIGHTS_DETAIL matching the partially filled out instance of the aspect SCOL_FLIGHTS_DETAIL sent by the application program 12 as part of the value set request.

Specifically, the application program 12 sends to the service provider 34 a value set request with the CARRID specified as "A*", and other fields CARRNAME, CONNID, COUNTRYFR, CITYFROM, COUNTRYTO, and CITYTO set to NULL. The service provider 34 searches in the backend database 24 for all instances of the aspect SCOL_FLIGHTS_DETAIL matching the partially filled out instance of the aspect SCOL_FLIGHTS_DETAIL. This match includes all instances in the backend database 24 having CARRID beginning with an "A". The service provider 34 then generates a first list of these instances and removes instances whose CARRID values are duplicated to generate a second list. That is, if backend database 24 stores two flights for CARRID="AF" (Air France®), resulting in a first list with the two flights, the second list only has one CARRID="AF" entry. This second list follows the SCOL_DDIC_KEY_TEXT_LIST format with the FIELDKEY field containing the CARRID text and the TEXT field containing the CARRNAME text. In general, the SCOL_DDIC_KEY_TEXT_LIST format can be used to return a technical name (FIELDKEY) and a longer text name or nickname (TEXT).

Upon receiving the second list with the SCOL_DDIC_KEY_TEXT_LIST structure, the application program 12 fills out the pop-up window 106 with the values in the second list. In other examples, the application program 12 presents to the user a dropdown list box with two columns containing the same information.

EXAMPLE II

Figure 5A:
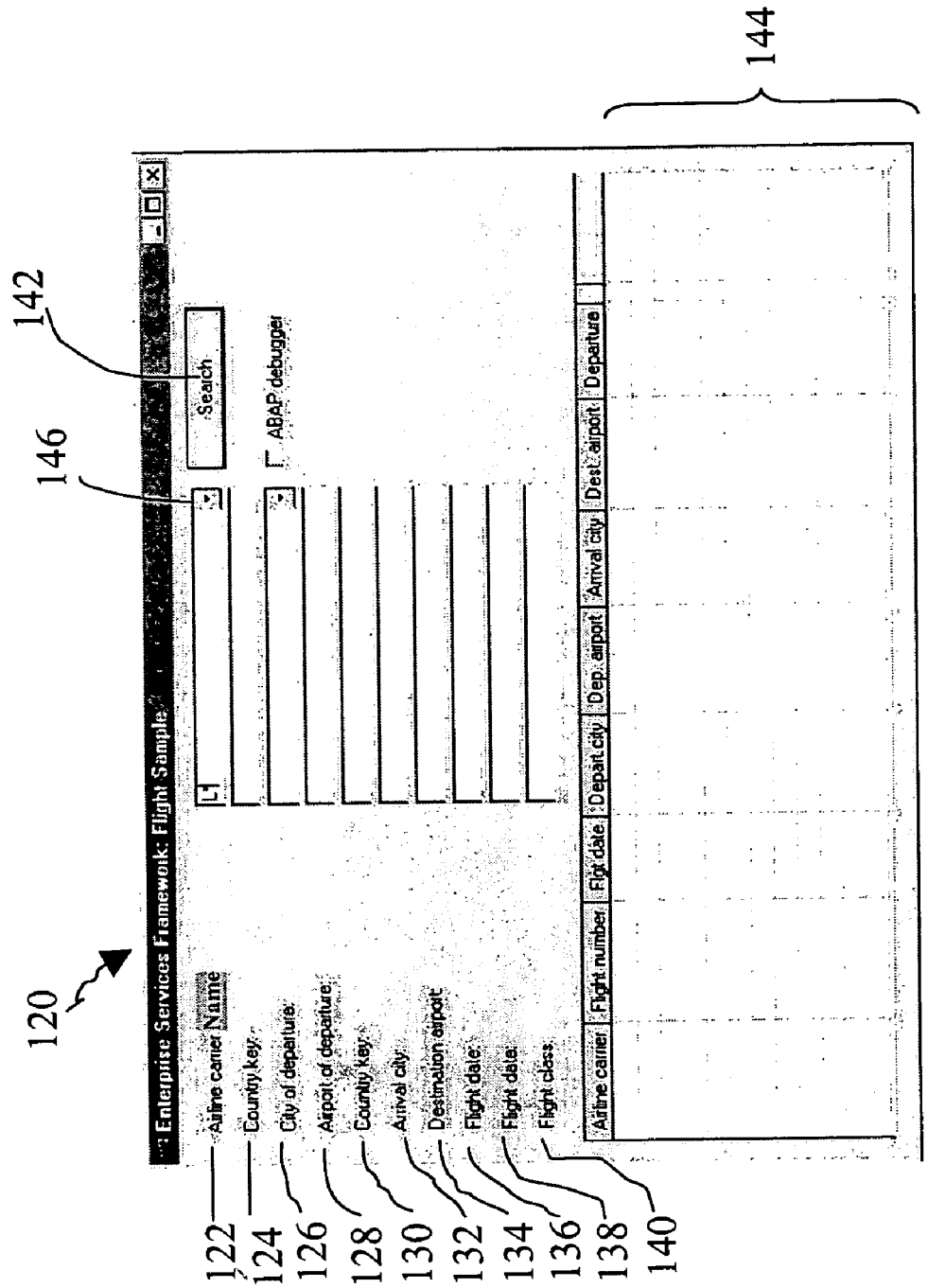
FIG. 5A is a screenshot of a GUI with a wildcard entry.

Referring to FIG. 5A, a menu screen 120 shows another example of the value set request CARRID to assist a user with a search for flight information. The GUI 28 (illustrated in FIG. 3) follows instructions of the application program 12 to generate the menu screen 120 to enabling a user to generate a search for flight data. The menu screen 120 presents a set of fields for search criteria for the user to specify. This search criterion includes an airline carrier name field 122, a country key field 124, a city of departure field 126, an airport of departure field 128, a country key field 130, an arrival city field 132, a destination airport field 134, flight date fields 136 and 138, and a flight class field 140. After specifying one or more of the search criteria, the user clicks a "Search" button 142 to initiate a search of flight data in the backend database 24 based on the specified search criteria. The application program 12 displays the results of the search in rows of a section 144 of the GUI 28.

For specifying a search criterion, e.g., an airline carrier, the user types in a name of an airline in the airline carrier name field 122. However, the user may not know the exact spelling of the airline. For example, the user may wish to search for flights offered by Lufthansa® but may only know that Lufthansa® begins with an "L". In this case, the user types an "L*" in the field 122 and clicks on a downward arrow 146. The application program 12 then initiates the value set request CARRID to the service provider 34.

Figure 5B:
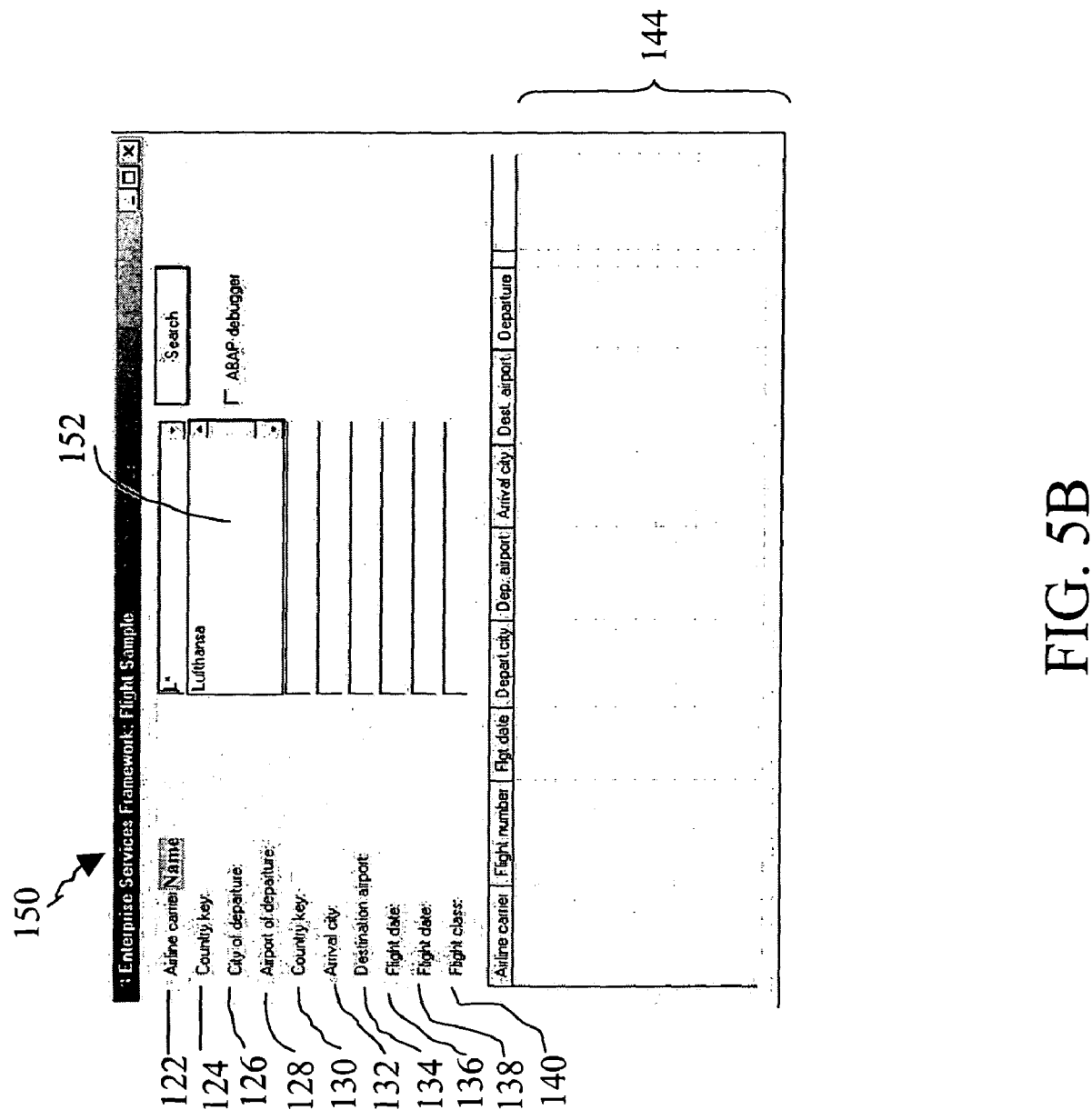
FIG. 5B is a screenshot of the GUI of FIG. 5A after the wildcard entry is entered, generating a pull down window with help data.

Referring to FIG. 5B, the results of the value set request are displayed in a drop-down-list box 152.

The meta data description of the value set request CARRID was described for Example I. For the example value set request to generate values for the drop-down-list box 152, the user sets the Airline Carrier Name field 146 with a wildcard "L*". When an instance of the return index table SCOL_DDIC_KEY_TEXT_LIST is passed to the application program 12 from the service provider 34, the FIELDKEY field contains the CARRID information and the TEXT field contains the CARRNAME information for instances of the aspect SCOL_FLIGHTS_DETAIL matching the partially filled out instance of the aspect SCOL_FLIGHTS_DETAIL sent by the application program 12 as part of the value set request.

Specifically, the application program 12 sends to the service provider 34 a value set request with the CARRID specified as "L*", and other fields CONNID, COUNTRYFR, CITYFROM, COUNTRYTO, and CITYTO set to NULL. The service provider 34 searches in the backend database 24 for all instances of the aspect SCOL_FLIGHTS_DETAIL matching the partially filled out instance of the aspect SCOL_FLIGHTS_DETAIL. This match includes all instances in the backend database 24 having CARRID beginning with an "L". The service provider 34 then generates a first list of these instances and removes instances whose CARRID values are duplicated to generate a second list. That is, if backend database 24 stores two flights for CARRID="LH", resulting in a first list with the two flights, the second list only has one CARRID="LH" entry. This second list follows the SCOL_DDIC_KEY_TEXT_LIST format with the TEXT field containing the CARRNAME text "Lufthansa". The application program 12 then displays the CARRNAME text "Lufthansa".

Figure 6:
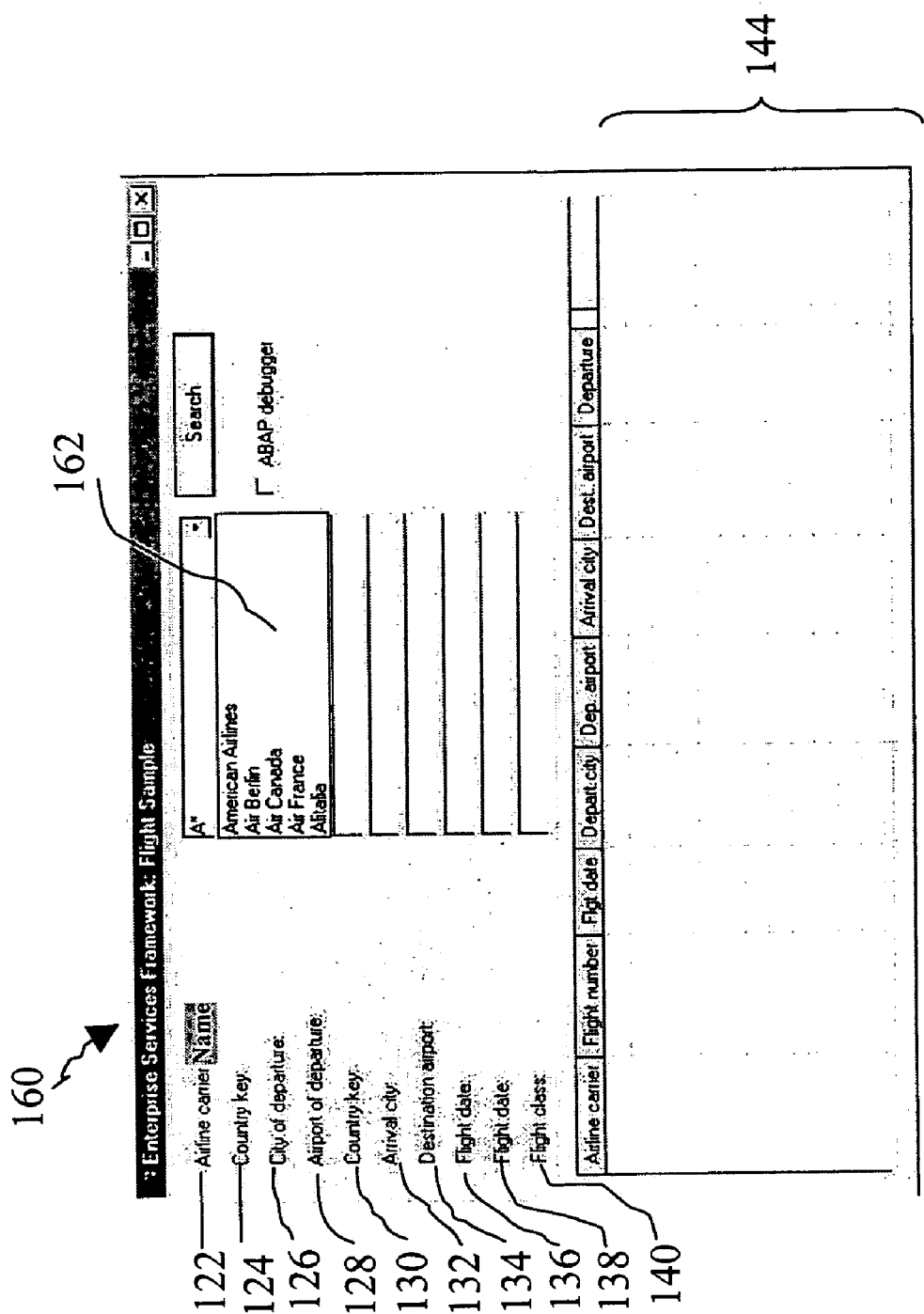
FIG. 6 is another example of a pull down window with help data.

Referring to FIG. 6, another example value set request for CARRID values is displayed by menu screen 160. A user types in "A*" in field 122 and the application program 12 sends a value set request for CARRID specified as "A*". The service provider 34 then returns a list of airline carrier IDs beginning with "A" and corresponding text names in the SCOL_DDIC_KEY_TEXT_LIST format. The application program 12 receives this list and the CARRNAME fields are displayed in the drop-down-list box 162.

EXAMPLE III

Figure 7:
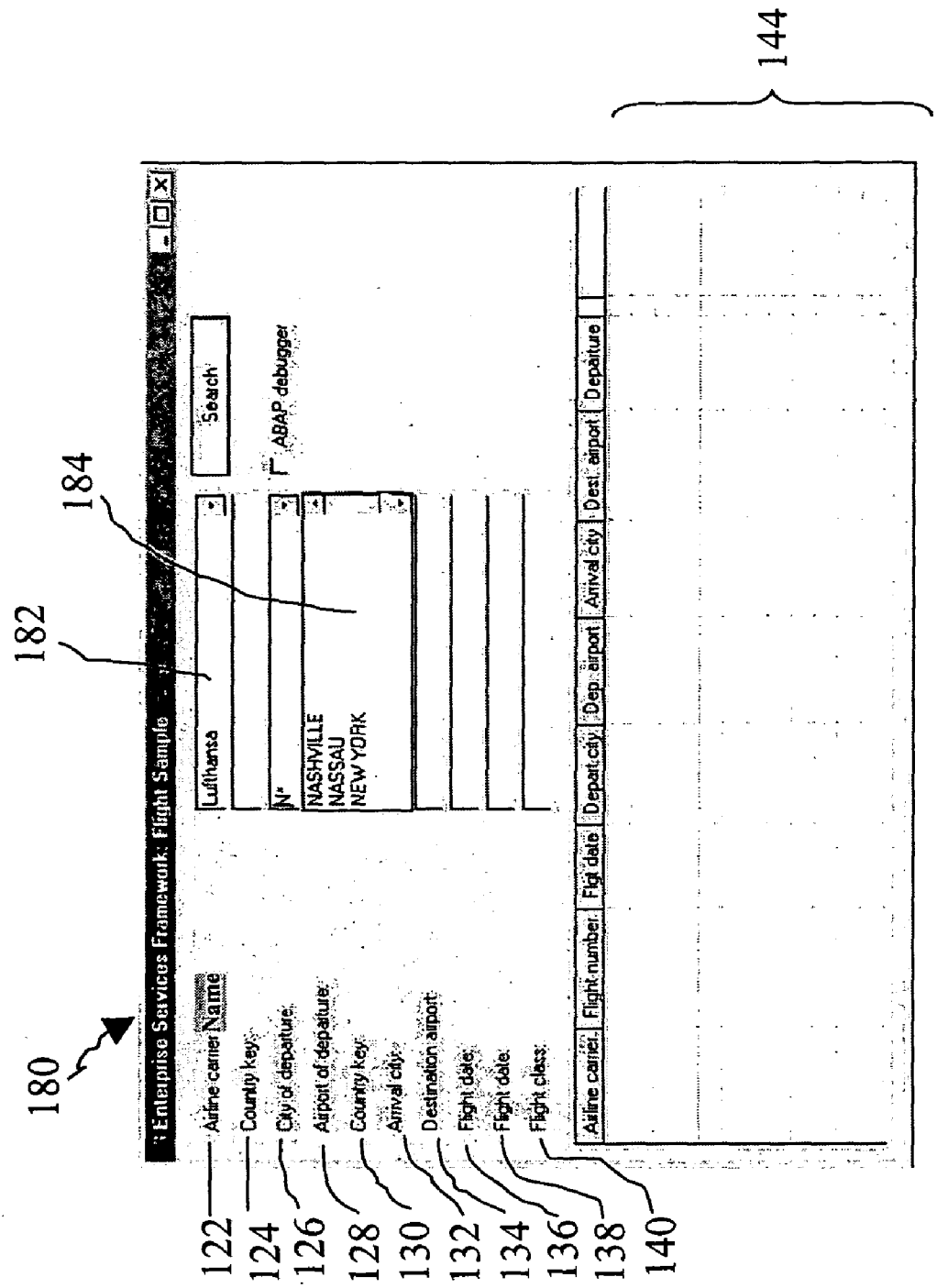
FIG. 7 is a screenshot of a GUI with a pull down window showing context dependent help data.

Referring to FIG. 7, a menu screen 180, similar to the menu screen 120, also allows a user to receive value set help for flight information. In this example, the user has already entered "Lufthansa" into the field 122. The user wants to enter in a city of departure in the field 126, but only knows that that the city name begins with an "N". The results of the value set request are displayed in a drop-down-list box 184. The list box 184 displays all cities starting with "N" where Lufthansa flights depart. This value set request is the CITYFROM value set request defined in the meta data table SCOL_VALUE_SET. For this example, the backend database 24 stores instances of the aspect SCOL_FLIGHTS_DETAIL that are listed in Table 3 (SPFLI) as follows.

TABLE 3

| SPFLI | | | | | |
|---|---|---|---|---|---|
| CARRNAME | CONNID | COUNTRYFR | CITYFROM | COUNTRYTO | CITYTO |
| American Airlines | 0017 | US | NEW YORK | US | SAN FRANCISCO |
| American Airlines | 0064 | US | SAN FRANCISCO | US | NEW YORK |

TABLE 3-continued

SPFLI

| CARRNAME | CONNID | COUNTRYFR | CITYFROM | COUNTRYTO | CITYTO |
|---|---|---|---|---|---|
| Alitalia | 0555 | IT | ROME | DE | FRANKFURT |
| Alitalia | 0788 | IT | ROME | JP | TOKYO |
| Alitalia | 0789 | JP | TOKYO | IT | ROME |
| Alitalia | 0790 | IT | ROME | JP | OSAKA |
| Delta Airlines | 0106 | US | NEW YORK | DE | FRANKFURT |
| Delta Airlines | 1699 | US | NEW YORK | US | SAN FRANCISCO |
| Delta Airlines | 1984 | US | SAN FRANCISCO | US | NEW YORK |
| Japan Airlines | 407 | JP | TOKYO | DE | FRANKFURT |
| Japan Airlines | 408 | DE | FRANKFURT | JP | TOKYO |
| Lufthansa | 400 | DE | FRANKFURT | US | NEW YORK |
| Lufthansa | 401 | US | NEW YORK | DE | FRANKFURT |
| Lufthansa | 402 | DE | FRANKFURT | US | NEW YORK |
| Lufthansa | 403 | DE | NASHVILLE | DE | FRANKFURT |
| Lufthansa | 404 | DE | NASSAU | DE | FRANKFURT |
| Lufthansa | 2402 | DE | FRANKFURT | DE | BERLIN |
| Lufthansa | 2407 | DE | BERLIN | DE | FRANKFURT |
| Qantas Airways | 5 | SG | SINGAPORE | DE | FRANKFURT |
| Qantas Airways | 6 | DE | FRANKFURT | SG | SINGAPORE |
| Signapore Airlines | 2 | SG | SINGAPORE | US | SAN FRANCISCO |
| Signapore Airlines | 15 | US | SAN FRANCISCO | SG | SINGAPORE |
| Signapore Airlines | 158 | SG | SINGAPORE | ID | JAKARTA |
| Signapore Airlines | 988 | SG | SINGAPORE | JP | TOKYO |
| United Airlines | 941 | DE | FRANKFURT | US | SAN FRANCISCO |
| United Airlines | 3504 | US | SAN FRANCISCO | DE | FRANKFURT |
| United Airlines | 3516 | US | NEW YORK | DE | FRANKFURT |
| United Airlines | 3517 | DE | FRANKFURT | US | NEW YORK |

For the meta data description of the value set request CITYFROM, the STRUCTURE is a string "SCOL_FLIGHTS_DETAIL" denoting the aspect SCOL_FLIGHTS_DETAIL. The FIELD is a string "CITYFROM" denoting the CITYFROM field in Table 3. Thus, the meta description of this value set request specifies that this value set request be intended to return possible values for the CITYFROM field. The INPARAM is SCOL_FLIGHTS_DETAIL so that the application program 12 is expected to send an instance of the aspect SCOL_FLIGHTS_DETAIL in order to receive the possible values for the CITYFROM field. This instance of the aspect SCOL_FLIGHTS_DETAIL specifies two fields, the CARRID field and the CITYFROM field. Since the value set request CITYFROM expects to receive an airline carrier ID in the CARRID field, the application program 12 first looks up the airline carrier ID "LH" corresponding to the airline carrier name "Lufthansa" in Table SCARR. The application program 12 then sends the airline carrier ID "LH" in the CARRID field of the value set request CITYFROM.

The OUTVALUES, or return index table, is the SCOL_DDIC_KEY_TEXT_LIST described previously for Example I. When an instance of the return index table SCOL_DDIC_KEY_TEXT_LIST is passed to the application program 12 from the service provider 34, the FIELDKEY field contains the CITYFROM information for instances of the aspect SCOL_FLIGHTS_DETAIL matching the instance of the aspect SCOL_FLIGHTS_DETAIL sent by the application program 12 as part of the value set request. In this example, the TEXT fields are a replication of the FIELDKEY fields.

Specifically, the application program 12 sends to the service provider 34 a value set request with the CARRID specified as "Lufthansa" and the CITYFROM specified as "N*", and other fields CONNID, COUNTRYFR, COUNTRYTO, and CITYTO set to NULL. The service provider 34 searches in the backend database 24 for all instances of the aspect SCOL_FLIGHTS_DETAIL matching the partially filled out instance of the aspect SCOL_FLIGHTS_DETAIL. This match includes all instances in the backend database 24 having CARRID="Lufthansa" and the CITYFROM="N*". The service provider 34 then generates a first list of these instances and removes instances whose CITYFROM values are duplicated to generate a second list. This first list contains instances with CITYFROM={NEW YORK, NASHVILLE, and NASSAU}. In this example, the second list is the same as the first list. This second list follows the SCOL_DDIC_KEY_TEXT_LIST format with the FIELDKEY field containing the CITYFROM text.

EXAMPLES OF DATA REPRESENTATION

Referring to FIGS. 8, 8A, and 9, another example of the GUI 28 is represented by GUI 210. The GUI 210 includes fields 212, 214, 216, 218, 220, and 222 for input of data by a user. The fields 212, 214, 216, 218, 220, and 222 belong to a data structure 252 and the fields correspond to data types 212', 214', 216', 218', 220', and 222', respectively. The fields 218, 220, and 222 belong to a subset 224. Entered values of fields in the subset 224 establish a context for a user help request for choices for field 216.

A display 226 of a list 228 shows appropriate data elements for the selected field 216, the data elements being appropriate to the context of the displayed data elements in fields 218, 220, and 222. The display 226 appears in response to the user clicking an icon 229. The display 226 allows the user to select one of the appropriate data elements.

These appropriate data elements have a type 216' that corresponds to the selected field 216. These appropriate data elements are read from a back end collection 250 of data in backend database 24 and transactional buffer 50. The collection 250 includes data structure instances 252, 254, 256, 258, 260, 262, 264, and 266. These instances represent possible combinations of data elements that could be displayed in the fields 212, 214, 216, 218, 220, and 222. The list 228 is derived from these possible combinations.

In response to the user clicking on icon 229, the application program 12 sends an INPARAMS specifying the structure 230 with types 212', 214', 216' not specified and types 218', 220', and 222' specified as "XXX", "YYY", and "ZZZ", respectively. The STRUCTURE also specifies a type of the structure 230. The FIELD specifies type 216'. The OUTVALUES returned to the application program 12 is the list 228 or {"AAA", "BBB", "CCC", and "DDD"}.

On the backend, the value set service provider 48 handles the request by the application program 12 by determining which of the possible instances of data elements in the collection 250 are appropriate to the context established by data set 224. To do this, the service provider 48 determines that instances 254, 258, 260, 264, and 266 in data set 268 match the context of the data set 224 since fields 218', 220', and 222' of these instances match the data set 224. From these instances, the service provider 48 determines that values in field 216 are repeated for instances 264 and 266. The service provider 48 returns the list 228 as OUTVALUES to the application program 12.

Referring to FIGS. 10, 10A, and 11, a GUI 300 is the GUI 210 in a different configuration. GUI 300 includes the context established by the set 224 but the user has also entered in a wildcard "A*" in field 216. A different backend data collection 302 includes an instance 304 of the data structure defined by the fields 212, 214, 216, 218, 220, and 222.

In response to the user clicking on icon 229, the application program 12 sends a value set request with an INPARAMS specifying a structure 310 with types 212', 214'not specified and types 216', 218', 220', and 222' specified as "A*", "XXX", "YYY", and "ZZZ", respectively. The STRUCTURE specifies the type of the structure 310. The FIELD specifies type 216'. The OUTVALUES returned to the application program 12 is the list 306 or {"AAA", "ABB"}.

On the backend, the value set service provider 48 handles the request by the application program 12 by determining which of the possible instances of data elements in the collection 302 are appropriate to the context established by data set 224 and the wildcard in field 216. To do this, the service provider 48 determines that instances 254, and 304 in the data set 302 match the context since fields 216', 218', 220', and 222' of these instances match the context. Specifically, the "AAA" and "ABB" matches the wildcard entry "A*". The service provider 48 returns the list 306 as OUTVALUES to the application program 12.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A method comprising:

storing a representation of a service in a repository, the service comprising handling of a request for a context-dependent data set derived from one or more collections of data elements, the data set being requested for one of a plurality of data fields based on values for other ones of the plurality of data fields, the representation comprising a database table including a plurality of records comprising:

a specification of a first data field of the plurality of data fields;

a specification of an input data structure comprising the first data field and a plurality of second data fields of the plurality of data fields, the second data fields defining a context for the first data field;

a specification of an output data structure for the context-dependent data set; and a name of a service provider;

receiving a request for the service from a software entity, the request comprising an instance of the input data structure, the instance of the input data structure comprising values for the second data fields;

comparing the request to the representation of the service;

selectively sending the request to the service provider only if the request complies with at least one of the records;

receiving one or more instances of the output data structure from the service provider based on the values for the second data fields;

generating the context-dependent data set comprising a list of non-repeating values for the first data field, based on the one or more instances of the output data structure; and sending the context-dependent data set to the software entity.

2. The method of claim 1, wherein the service provider determines the context-dependent data set by matching the data elements of the one or more collections against the instance of the input data structure of the request.

3. The method of claim 2, wherein the matching comprises matching one or more fields of the data elements of the one or more collections against one or more fields of the instance of the input data structure of the request.

4. The method of claim 2, wherein one or more fields of the instance of the input data structure are unspecified, and further wherein the data elements of the one or more collections are not matched against the unspecified one or more fields of the instance.

5. The method of claim 1, wherein the software entity controls a graphical user interface and the context-dependent data set is a set of help values for a user.

6. The method of claim 5, wherein the graphical user interface enables the user to select a value from the help values.

7. The method of claim 1, wherein the one or more collections of data elements comprise data elements stored in a database.

8. The method of claim 7 further comprising:

receiving a request for modifications to a collection from the one or more collections of data elements;

sending the request to a service provider, the service provider configured to store the modifications in a transaction buffer and subsequently update the database with the modifications.

9. The method of claim 8, wherein a collection from the one or more collections of data elements comprises modifications to the data elements in the transaction buffer.

10. The method of claim 1, wherein the output data structure comprises a data structure of the context-dependent data set and a text description of each data element in the context-dependent data set.

11. The method of claim 1, wherein the data elements are text strings, and further wherein the instance of the input data structure in the request comprises a beginning of a text string and a wildcard symbol.

12. The method of claim 11, wherein the service provider detects the wildcard symbol and determines the one or more instances of the output data structure by matching beginnings of the data elements in the one or more collections against the beginning of the text string of the instance of the input data structure.

13. A system comprising:

a first computer configured to execute a client program;

a second computer linked to the first computer by a network and configured to execute a server program, the server program being configured to execute the following:

storing a representation of a service in a repository, the service comprising handling of a request for a context-dependent data set derived from one or more collections of data elements, the data set being requested for one of a plurality of data fields based on values for other ones of the plurality of data fields, the representation comprising a database table including a plurality of records comprising:

a specification of a first data field of the plurality of data fields;

a specification of an input data structure comprising the first data field a plurality of second data fields of the plurality of data fields, the second data fields defining a context for the first data field;

a specification of an output data structure for the context-dependent data set; and a name of a service provider;

receiving a request for the service from a software entity, the request comprising an instance of the input data structure, the instance of the input data structure comprising values for the second data fields;

comparing the request to the representation of the service;

selectively sending the request to the service provider only if the request complies with at least one of the records;

receiving one or more instances of the output data structure from the service provider based on the values for the second data fields;

generating the context-dependent data set comprising a list of non-repeating values for the first data field, based on the one or more instances of the output data structure; and sending the context-dependent data set to the software entity.

14. The system of claim 13, wherein the service provider determines the context-dependent data set by matching the data elements of the one or more collections against the instance of the input data structure of the request.

15. The system of claim 14, wherein the matching comprises matching one or more fields of the data elements of the one or more collections against one or more fields of the instance of the input data structure of the request.

16. The system of claim 14, wherein one or more fields of the instance of the input data structure are unspecified, and further wherein the data elements of the one or more collections are not matched against the unspecified one or more fields of the instance.

17. The system of claim 13, wherein the software entity controls a graphical user interface and the context-dependent data set is a set of help values for a user.

18. The system of claim 17, wherein the graphical user interface enables the user to select a value from the help values.

19. The system of claim 13, wherein the one or more collections of data elements comprise data elements stored in a database.

20. The system of claim 19, wherein the server program is further configured to execute:
   receiving a request for modifications to a collection from the one or more collections of data elements;
   sending the request to a service provider, the service provider configured to store the modifications in a transaction buffer and subsequently update the database with the modifications.

21. The system of claim 20, wherein a collection from the one or more collections of data elements comprises modifications to the data elements in the transaction buffer.

22. The system of claim 13, wherein the output data structure comprises a data structure of the context-dependent data set and a text description of each data element in the context-dependent data set.

23. The system of claim 13, wherein the data elements are text strings, and further wherein the instance of the input data structure in the request comprises a beginning of a text string and a wildcard symbol.

24. The system of claim 23, wherein the service provider detects the wildcard symbol and determines the one or more instances of the output data structure by matching beginnings of the data elements in the one or more collections against the beginning of the text string of the instance of the input data structure.

25. A server comprising:
   a processor;
   a non-transitory storage medium storing a server program, the server program instructing the processor to execute the following steps:
      storing a representation of a service in a repository, the service comprising handling of a request for a context-dependent data set derived from one or more collections of data elements, the data set being requested for one of a plurality of data fields based on values for other ones of the plurality of data fields, the representation comprising a database table including a plurality of records comprising:
         a specification of a first data field of the plurality of data fields;
         a specification of an input data structure comprising the first data field and a plurality of second data fields of the plurality of data fields, the second data fields defining a context for the first data field;
         a specification of an output data structure for the context-dependent data set; and
         a name of a service provider;
      receiving a request for the service from a software entity, the request comprising an instance of the input data structure, the instance of the input data structure comprising values for the second data fields;
      comparing the request to the representation of the service;
      selectively sending the request to the service provider only if the request complies with at least one of the records;
      receiving one or more instances of the output data structure from the service provider based on the values for the second data fields;
      generating the context-dependent data set comprising a list of non-repeating values for the first data field, based on the one or more instances of the output data structure; and
      sending the context-dependent data set to the software entity.

\* \* \* \* \*